Patented Nov. 24, 1931

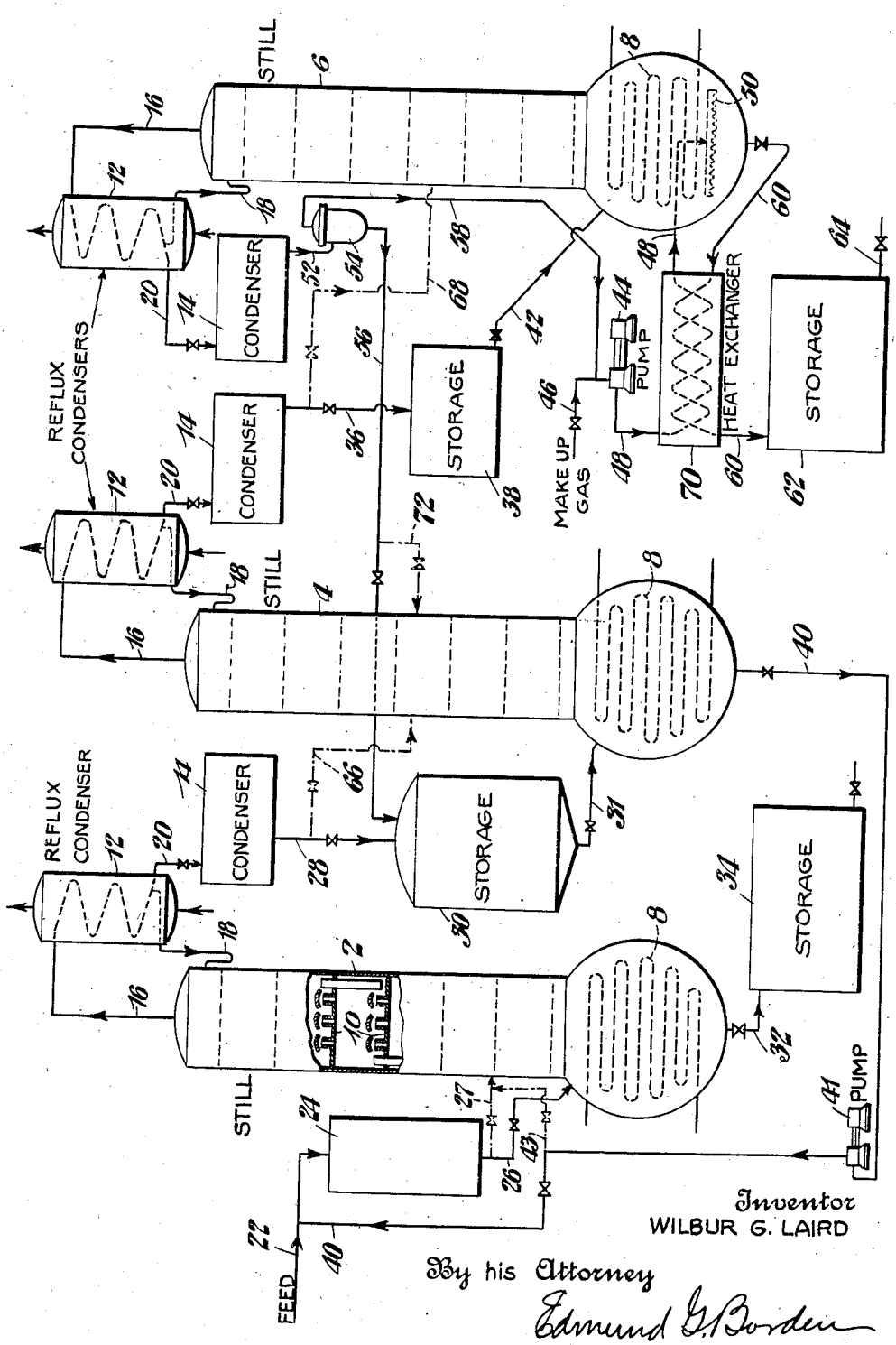

1,833,717

UNITED STATES PATENT OFFICE

WILBUR G. LAIRD, OF NEW YORK, N. Y., ASSIGNOR TO HEAT TREATING COMPANY, OF NEW YORK, N. Y., A CORPORATION OF DELAWARE

PURIFICATION AND CONCENTRATION OF LIQUIDS

Application filed January 13, 1927. Serial No. 160,852.

This invention relates to the purification, concentration and separation of the components of liquid mixtures, or separation of the components of liquid mixtures.

Primarily the invention relates to the treatment of azeotropic or constant boiling mixtures whereby the components thereof are separated and obtained in a substantially pure state.

One of the most common mixtures of this type is the constant boiling mixture (C. B. M.) of ethyl alcohol and water from which relatively pure alcohol is now commercially obtained only after treatment with lime and subsequent distillation. Other processes have been proposed in which a third liquid is mixed with the C. B. M. of ethyl alcohol and water, a separation being effected by fractional distillation. However with these processes in which a third substance is added an important objection arises from the fact that the desired liquid is apt to become more contaminated instead of purified and that such, or a similar procedure is not equally applicable for the separation of the components of all constant boiling mixtures.

By the present invention the mixture to be separated is not contaminated by any foreign substance or subjected to a chemical reagent for the fixation of any component as is done for example in the separation of acetone and methyl alcohol or ethyl alcohol and water referred to above. On the contrary the mixture to be separated and which is the result of a distillation, for example of a crude dilute liquid, whereby a constant boiling mixture has been obtained, is subjected to a final distillation usually in a bubble cap column still, with the addition that a gas is passed through the mixture and upward through the still with the vapors being evolved. The gas is separated from the vapors by condensation of the latter and may be recirculated through the system.

The present invention is based on the fact that a constant boiling mixture produced under normal conditions of pressure does not have the same composition as one produced under a different pressure or under conditions affecting the distilling ratio or relative volatility of the components. For example, a constant boiling mixture produced by distillation at normal pressure may be separated by subjecting it to a further distillation in which an inert gas is bubbled through the mixture to secure the effect of a sub-atmospheric pressure or vacuum distillation. This change alters the ratio of the components distilling over so that eventually one of the components either remains as a substantially pure liquid in the still or is distilled over as such, depending on the nature of the mixture.

Accordingly this invention has for its object the provision of a process whereby constant boiling mixtures may be resolved into their respective components by distillation or concentration.

A further object is to simplify distillation processes and provide a highly efficient process for the resolution of constant boiling mixtures.

Still a further object is to separate such mixtures without adding an additional substance to the mixture.

With these and other objects in view, the invention will now be described, reference being had to the accompanying drawing, in which—

The figure is a diagrammatic elevational view of an apparatus adapted for carrying out the preferred form of the process.

The apparatus comprises a series of column stills 2, 4 and 6 of identical construction, each having a heating means which for purposes of illustration is a steam coil 8 mounted in the lower portion of each still. Each still is made up of a series of bubble cap plates 10 as shown in the broken portion of still 2. Connected with each of these stills is a reflux condenser 12 and an ordinary water cooled condenser 14. Vapors leaving the stills pass by vapor lines 16 into reflux condensers 12, from which the condensates flow by liquid sealed pipes 18 onto the top trays of the stills, the vapors remaining uncondensed passing by valved vapor pipes 20 into water cooled condensers 14.

Assuming for purposes of illustration that it is desired to obtain substantially pure isopropyl alcohol from a dilute liquor containing for example 10 or 20% of the alcohol mixed with water, the raw mixture is introduced by a pipe 22, into a supply storage tank 24 from which the still 2 is charged by a valved feed line 26. The charge in the still 2 is heated to produce distillation and a rough cut containing from 80 to 85% by weight isopropyl alcohol is taken over and condensed in the condenser 14 from which the condensate is led by a valved pipe 28 into a storage tank 30. After the alcohol is nearly all over the residue in the still and which may be nothing but pure water is withdrawn by a valved pipe 32 into a storage tank 34 or discharged to waste. In the separation of other mixtures such as methyl alcohol and acetone storage 34 will be used to receive one of the pure components (methyl alcohol).

The next step in the process is to convert the rough cut containing 80 to 85% isopropyl alcohol into the constant boiling mixture. This is accomplished by charging the still 4 from the storage 30 by a valved pipe 31 and carrying out the distillation so that the vapor taken over into the condenser 14 for this still, is the constant boiling mixture at normal pressure containing 87.9% by weight of the alcohol. The condensate from this condenser is passed by a valved pipe 36 into a storage tank 38. In the still 4 no attempt is made to run the bottoms lower than 10% alcohol, which is withdrawn by a valved pipe 40 and passed by pump 41 to the storage tank 24 from which it is withdrawn to still 2 along with original feed liquid.

The procedure described above is merely an example of a convenient and efficient method for producing the azeotropic mixture from raw liquor. This mixture, which behaves on distillation at normal pressure as a single chemical individual, may be obtained by a careful distillation in one column still or by other methods but it is preferred to use two distillations because of the ease with which the constant boiling mixture is obtained from a mixture of high isopropyl alcohol content.

Regardless of the source of the constant boiling mixture in the storage 38, the still 6 is charged therewith by a valved pipe 42 and heat is applied by the steam coil 8 to bring the mixture up to the distilling temperature. Simultaneously with the heating a pump 44 is started which draws gas by valved line 46 from any convenient source and passes it through a pipe 48, which connects with a gas distributor 50 mounted in the lower portion of the still 6. The gas is introduced into the body of liquid in the lower portion of the still and acts to reduce the partial pressure of the vapors produced in the distillation and also the distilling temperature. The gas and vapor pass upward through the column, bubbling through and agitating the bodies of condensate maintained on the trays and is finally separated in the condenser 14 by condensation of the vapors. The condensate and gas leave the condenser by a pipe 52 and enter a trap 54 from which the condensate is discharged by a pipe 56, and the gas by a pipe 58, the latter connecting directly with the inlet of pump 44. This construction permits the cyclic circulation of the gas through the still 6, reflux condenser 12, water cooled condenser 14, trap 54, through the pump and back to the still, so that make up gas need be introduced by pipe 46 only in starting and to replace gas lost in the system. The introduction of gas into the distilling mixture reduces the partial vapor pressure of the vapors and has the effect of a vacuum distillation while the physical or absolute pressure is maintained normal. In this distillation the vapors being condensed in condenser 14 contain a higher percentage of water than the constant boiling mixture charged into the still and is therefore sent to storage tank 30 by pipe 56. It is at once apparent that the effect of taking off a vapor from still 6 having a higher water content than the liquid being distilled is to "dry" this liquid. When, therefore, the water has been completely removed the pure or substantially pure isopropyl alcohol remaining in the still is withdrawn by a valved pipe 60 and passed to a storage tank 62 from which the pure product may be removed as desired by means of a valved outlet 64.

The constant boiling mixture of isopropyl alcohol and water used in the final distillation and containing 87.9% by weight of the alcohol, boils at a temperature of 80.35° C. at 760 mm. whereas the boiling point of pure isopropyl alcohol is 82.8° C. The distillate recovered from the still 6 and passed to storage tank 30 usually contains from 3 to 4% more water than the mixture introduced into this still, this, however, depending to some extent on the amount of gas passed through the liquid under distillation.

Instead of operating the stills on the batch or intermittent procedure described above they may be operated continuously with but slight changes. If such operation is desired charging stock from storage 24 is continuously passed into the still 2, preferably onto the tray containing liquid corresponding to its composition by a valved pipe 27 and the pure component (water) is continuously discharged by pipe 32 to storage tank 34. The vapor taken over from this still and condensed in condenser 14 is passed by pipes 28 and 66 onto the proper tray of still 4, the valve in pipe 28 being closed and that in pipe 66 being open. The liquid continuously withdrawn from the still 4 by pipe 40 is now passed by a pump 41 and a valved pipe 43 onto the proper tray in still 2 while the distillate (constant boiling mixture) is passed by pipes 36 and 68 onto the tray in still 6 which contains liquid corresponding to its composition. As in the previous case the valve in pipe 36 is closed and that in pipe 68 is open. The pure liquid (isopropyl alcohol) is withdrawn continuously from the final still 6 by the pipe 60 and passed through a heat exchanger 70 where it is cooled by heat exchange with the gas from the pump 44, thus providing means for keeping the sensible heat of this liquid in the still. Condensate discharged from the condenser of this unit by pipe 56 is passed by a valved pipe 72 into still 4 and onto the tray therein which contains liquid of approximately the same composition. The valve in pipe 56 is closed during this operation. With continuous distillation of isopropyl alcohol and water the water is continuously withdrawn from the still 2 while pure isopropyl alcohol is continuously withdrawn from the still 6.

Under certain conditions it may be desirable to operate the still 6 at pressures lower than atmospheric in order to amplify the effect of the gas or when distilling liquids which may decompose at the distilling temperature corresponding to atmospheric pressure. Such a lower pressure may be obtained by drawing on line 58 by pump 44, and limiting the amount of gas passed to the distributor. In this case however, a perfect vacuum cannot be obtained in the lower part of the still unless the bubble trays are substituted by filling material.

The gas recirculated through the still 6 may be any gas such as carbon dioxide, nitrogen, hydrogen, air, steam, or other convenient gas suitable for the purpose. Steam would not be used if water was one of the components of the C. B. M. Where the product sought is desired in an exceptionally pure state the recirculated gas is preferably passed through a "drying" chamber or absorber to remove any trace of the substance not being taken pure from the still 6 before it is reintroduced into the bottom of the still or a dry gas may be introduced without recirculation. It is to be understood that any available gas may be used to carry out the distillation so long as it does not react chemically with the desired product or products to be recovered, but the use herein or in the claims of the phrase "inert gas", "gas inert to the mixture" or similar phrases, is not to be construed as excluding the use of a gas which may react slightly with one of the constituents of the mixture such as the reaction or solution of carbon dioxide in water, and similar easily reversible reactions of gases with other liquids.

The azeotropic mixture of isopropyl alcohol and water produced under normal pressure has been used to illustrate the application of the process, but the invention is in no wise limited thereto since it is equally effective in separating any other liquids forming such mixtures. Some examples of such mixtures occurring in the industries are: acetone-methyl alcohol ("methyl acetone"), amyl acetate-amyl alcohol, amyl alcohol-amyl bromide, benzene-ethyl alcohol, benzene-methyl alcohol, carbon tetrachloride-methyl alcohol, ethyl acetate-ethyl alcohol, pyridine-water, ethyl alcohol-water, hydrochloric acid-water and isopropyl alcohol-water.

Ternary and other mixtures are treated in substantially the same manner as binary mixtures except that an additional distillation may be necessary if the components are completely miscible in each other as are most of those cited above.

Constant boiling mixtures are usually considered to either have a "minimum" or a "maximum" boiling point, the mixture isopropyl alcohol-water has a "minimum" while acetone-chloroform has a "maximum" boiling point at 64.7° C. containing 80% by weight acetone. If a "maximum" boiling mixture is treated in the apparatus illustrated, the pure components will as a rule distil over, while the constant boiling mixtures corresponding to the different distilling conditions will be drawn off in the bottoms and passed to the proper still as is done with the distillate in the illustration given. Some "minimum" mixtures also behave in this way. By knowing the character of the mixture treated the operator can alter the arrangement of the stills to suit the occasion. Likewise a given mixture may require the use of the gas circuit in the still 4 instead of the still 6 in order to make the desired separation. This change would be necessary or advantageous for example in the case of a "minimum" C. B. M. in which the use of the gas circuit produced a C. B. M having a higher per cent of the component retained in the still 6 on final distillation than is produced in still 4. The same general principle applies for the use of the gas circuit with a "maximum" C. B. M.

One of the most important factors in determining the ease of separation of components by distillation is their relative volatility. For a constant boiling homogeneous liquid mixture the composition of the vapor is the same as that of the liquid; therefore the relative volatilities of the components are the same. But in accordance with the present invention a C. B. M. is subjected to distillation under altered physical conditions with respect to the previous distillation so as to change the relative volatilities of the components with respect to each other; that is, distillation is carried on under conditions such that the relative volatility of the respective components is unequal. When this condition is attained the components may be separated by distillation, and the greater the inequality the greater the ease with which the separation can be effected. Accordingly, provision is made for the use of pressures above atmospheric in any one of the stills by proper regulation of the valves in the vapor lines 20. If, for example, in the distillation of isopropyl alcohol a pressure of from 25 to 100 pound per square inch is held on the still 4 a C. B. M. containing approximately 92 to 94% of the alcohol is produced. Now when this C. B. M. is distilled in still 6 with the gas circuit the distillate taken over contains from 6 to 8% more water than the mixture being distilled. It is readily apparent that by the use of pressure on the still 4 the rate of removing water from isopropyl alcohol is practically doubled over the rate where normal pressure is used. Superatmospheric pressure may also be used on still 2 to relatively repress the volatility of one of the components.

Besides the resolution of "maximum" and "minimum" constant boiling mixtures the principles of the invention may be applied to increasing the rate of separation by distillation of liquid mixtures, the components of which have substantially the same relative volatility.

In operating the apparatus the use of temperature and pressure measuring instruments and insulation is presumed as is common in the distilling art. Likewise the various connections necessary for any particular operation is considered to be within the skill of the operator and therefore the showing of every pump, pipe or valve is deemed unnecessary.

The term "liquid" as used in the specification and claims is to be construed to include any substance or mixture which is reasonably capable of being liquefied either by heat or cooling and compression.

In the distillation of high boiling liquids the stills may be directly heated or lead, mercury, sulphur or other substances either in liquid or vapor state may be used instead of steam.

The letters "C. B. M." used in the specification mean "constant boiling mixture."

Having thus described the preferred form of the invention what is claimed as new is:

1. The process of separating the components of azeotropic liquid mixtures, which comprises heating such a mixture to produce vapors therefrom, simultaneously passing a gas inert to said mixture through said mixture and separating said gas from said vapors by fractionally condensing the latter.

2. The process of resolving azeotropic liquid mixtures, which comprises distilling such a mixture and simultaneously passing an inert gas through said mixture whereby the composition thereof is altered.

3. The process defined in claim 2 in which the gas is "dried" of at least one of the components before being reintroduced into said mixture.

4. The process of separating the components forming constant boiling liquid mixtures, which comprises simultaneously heating and passing a gas inert to the mixture through a body of said mixture in a still to produce vapors therefrom, and fractionally condensing said vapors.

5. The process of separating the components forming constant boiling liquid mixtures by the distillation of such a mixture in a column still, which comprises passing a gas inert to the mixture upward through the still in contact with said mixture during the distillation thereof, whereby the physical properties of said mixture are altered.

6. The process of resolving azeotropic liquid mixtures which comprises distilling such a mixture in a bubble cap column still, passing a gas inert to the mixture upward through the still in contact with the liquids therein whereby a separation of the components of said mixture is effected.

7. The process defined in claim 6 in which said gas is recirculated through said still.

8. In the process of separating the constituents of azeotropic liquid mixtures produced by distillation, the improvement which comprises distilling such a mixture under normal pressure and passing a gas inert to the mixture through the mixture during the latter distillation whereby said separation is effected.

9. The process of obtaining one of the constituents of a constant boiling liquid mixture which comprises distilling said mixture, passing the vapors evolved through a series of bodies of condensate produced from said mixture and mingling a gas inert with respect to said vapors in their passage through said bodies.

10. In the process of separating the constituents of a constant boiling liquid mixture produced by distillation, the improvement which comprises heating and distilling said mixture under a lower physical pressure than the previous distillation and recirculating an inert gas in contact with said mixture during the latter distillation whereby the composition of said mixture is altered.

11. In the process of resolving liquid mixtures the components of which form a constant boiling mixture on distillation, and in which said liquid mixture is distilled to produce a condensate which is substantially said constant boiling mixture, the improvement which comprises subjecting said condensate to distillation and passing a gas inert with respect to the components of the mixture through the mixture being distilled during one of said distillations.

12. The process of separating the components of azeotropic liquid mixtures, which comprises subjecting a body of such a mixture to distillation, passing the vapors evolved through a series of bodies of condensate produced from said mixture, and violently agitating said mixture and bodies of condensate by bubbling a gas inert with respect to the components of said mixture therethrough.

13. The process of separating the components of liquid mixtures in which the relative volatilities of said components are substantially equal, which comprises distilling such a mixture and passing a gas inert with respect to said mixture therethrough during said distillation whereby said relative volatilities are rendered sufficiently unequal to allow separation of said components by fractional distillation.

14. The process of separating the components of liquid mixtures which comprises producing such a mixture by distilling crude liquor under a superatmospheric pressure, distilling said mixture and simultaneously bubbling a gas inert with respect to the components of said mixture therethrough.

15. In the process of separating the components of liquid mixtures which behave on distillation as an azeotropic mixture in which such a mixture is produced by fractionally distilling a crude liquor containing liquids which form such a mixture, the improvement which comprises fractionally distilling said mixture under normal pressure while bubbling a gas chemically inert with respect to said mixture therethrough.

16. The process defined in claim 15 in which said crude liquor is fractionally distilled under superatmospheric pressure.

17. The process of separating the components of liquid mixtures which behave on distillation as an azeotropic mixture, which comprises distilling such a mixture under normal physical pressure but under conditions which produce the effect of a sub-atmospheric pressure distillation.

18. In the separation of the components of a constant boiling liquid mixture, the process which comprises producing a constant boiling mixture of said components from a liquor containing said components, by distillation under a super-atmospheric pressure, and subjecting the constant boiling mixture thus produced to a distillation under normal pressure in the presence of a substantially inert gas.

In testimony whereof I affix my signature.

WILBUR G. LAIRD.